United States Patent [19]

Gregory

[11] Patent Number: 4,601,803
[45] Date of Patent: Jul. 22, 1986

[54] ELECTROCHEMICAL MACHINING TECHNIQUE AND APPARATUS

[75] Inventor: Barry W. Gregory, Hebron, Conn.

[73] Assignee: J. T. Slocomb Co., S. Glastonbury, Conn.

[21] Appl. No.: 700,264

[22] Filed: Feb. 11, 1985

[51] Int. Cl.⁴ .......................... B23P 1/02; C25D 17/10
[52] U.S. Cl. ............................... 204/224 M; 204/129.6
[58] Field of Search ................ 204/224 M, 129.6, 271, 204/272, 275

[56] References Cited

U.S. PATENT DOCUMENTS

| | | | |
|---|---|---|---|
| 3,075,903 | 1/1963 | Costa et al. | 204/129.6 |
| 3,467,592 | 9/1969 | Eisberg, Jr. et al. | 204/129.6 |
| 3,714,018 | 1/1973 | Shaw | 204/129.6 |
| 3,793,170 | 2/1974 | Andrews | 204/129.6 |
| 3,990,959 | 11/1976 | Payne et al. | 204/129.6 |
| 4,250,011 | 2/1981 | Capello et al. | 204/224 M |

*Primary Examiner*—John F. Niebling
*Assistant Examiner*—Terryence Chapman

[57] ABSTRACT

Portable and flexible electrolytic machining apparatus is characterized by ease of stylus replacement and individual stylii configured to optimize the particular machining operation to be performed. The stylus, through which the electrolyte is discharged onto the workpiece, is resiliently captured in a handle and may be rotated relative thereto. In some embodiments of the invention the electrolyte discharge port in the stylus has an annular shape and is defined by inner and outer conductive members which have a common connection to the power supply of the apparatus.

12 Claims, 4 Drawing Figures

ELECTROCHEMICAL MACHINING TECHNIQUE AND APPARATUS

BACKGROUND OF THE INVENTION (1) Field of the Invention

The present invention relates to the machining of electrically conductive materials and particularly to a novel electrochemical process for use in the controlled removal of material from a metallic work piece. More specifically, this invention is directed to portable electrolytic machining apparatus and especially to novel styli for use in the controlled removal of electrically conductive material from a work piece. Accordingly, the general objects of the present invention are to provide novel and improved methods and apparatus of such character.

(2) Description of the Prior Art

Electrochemical machining apparatus and methods are well-known in the art. The known methods and apparatus are used for diverse purposes such as deburring, radiusing of edges, cutting foil and various other stock removal procedures. Examples of prior art electrochemical machining techniques and apparatus may be seen from U.S. Pat. Nos. 2,848,410, 3,183,176, 3,202,598, 3,276,988, 3,384,563, 3,846,262, and 4,206,028.

The prior art electrochemical, or as they are often known electrolytic, machining techniques and apparatus, while adequate for their intended purpose, are generally characterized by a lack of flexibility. That is, the prior apparatus and techniques have customarily been designed for accomplishing a particular task and are not readily adaptable for use with work pieces which are quite different from that for which the particular apparatus or technique has been designed. This lack of flexibility is to a large measure the result of difficulty in changing the stylus which is juxtapositioned to the work piece during the electrochemical machining operation and/or a lack of interchangable styli of different design. It is to be noted that the stylus itself will be gradually consumed during use of the tool and thus the inability to easily replace the same adds to the overall cost of electrolytic machining procedures.

Another common deficiency of the prior art resides in the inability to easily, i.e., in a single step, deburr or radius the edges of side bores which intersect a main bore. Yet another deficiency which has often characterized the prior art is a high rate of electrolyte flow which, because of the size of the pumps, basins and reservoirs required, increases the overall size and cost of the apparatus and diminishes the ability to transport and rapidly set up the apparatus for use.

SUMMARY OF THE INVENTION

The present invention overcomes the above-briefly discussed and other deficiencies and disadvantages of the prior art by providing novel and improved methods and apparatus for use in electrochemical machining. Particularly, the present invention provides electrolytic machining apparatus which is portable, has easily interchangeable styli and is capable of performing stock removal operations in a single step which, in the prior art, either could not be performed or required multiple machining steps.

Apparatus in accordance with the present invention comprises a tubular stylus which, when inserted in a cooperating handle, is resiliently captured therein in such a manner that it may be oriented in any desired rotational position. Also, upon insertion of the stylus in the handle, an electrolyte flow path through the stylus is completed and an electrical connection to a first terminal of the power supply of the apparatus is established. The electrolyte is delivered to the interior of the stylus via an electrically conductive tube in the handle, and is discharged onto the work piece from the stylus, and this tubular conductor will be connected in series with the stylus and power supply.

A stylus in accordance with the present invention may, at the tip thereof, define an annular electrolyte flow passage with the members which define the annulus being comprised of electrically conductive material. This arrangement results in the requisite current density and flow pattern, without arc-over, while simultaneously minimizing electrolyte flow. In an alternative stylus, the conductive tip of the stylus extends beyond an annular discharge port for the electrolyte and this projecting stylus tip will have a cross-sectional area and a shape determined by the work piece. In yet a further embodiment, the electrolyte is discharged from a port in the side of a tubular conductive portion of the stylus and a further conductor extends, within the tubular conductor, in a direction transverse to the direction of the electrolyte discharge through the port so as to establish the desired electrostatic field and thus provide the desired high current density.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENTS

Figure 1:
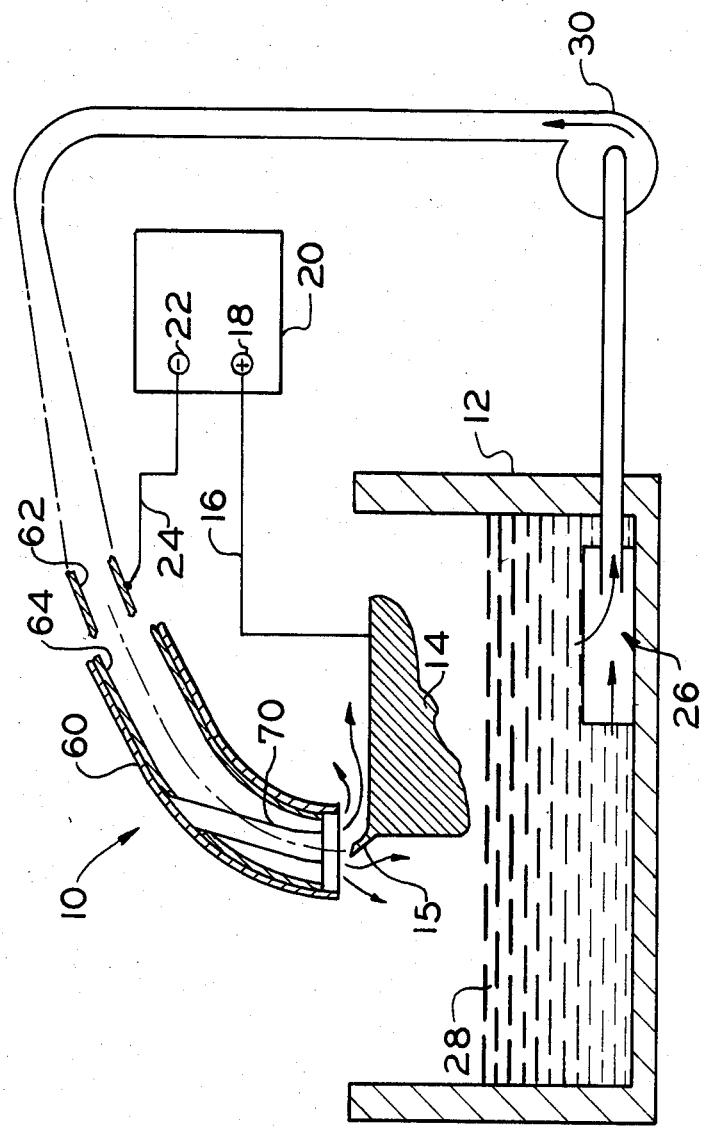
FIG. 1 is a schematic view, party in section, of a portable electrochemical machining apparatus in accordance with the present invention.

An electrochemical machining apparatus in accordance with the present invention is depicted schematically in FIG. 1. The machining apparatus comprises a stylus, indicated generally at 10, which forms the extension of a handle. The handle is not shown in FIG. 1 but is indicated generally at 11 in FIG. 2. In FIG. 1, in the interest of facilitating understanding of the invention, the stylus 10 has been depicted in exaggerated size. The apparatus also includes a basin 12 which will be comprised of a non-conductive material, such as fiberglass, which is not chemically attacked by the electrolyte. An electrically conductive work piece 14 is supported in basin 12. Work piece 14 has burrs, as indicated at 15, on an edge thereof. In operation, the electrochemical machining operation will remove the burrs 15 and, if desired, radius the edges of work piece 14. Work piece 14 will be connected, via conductor 16, to a first terminal 18 of a source of current which has been indicated generally at 20. The second, i.e., opposite polarity, terminal 22 of current source 20 will be electrically connected, via a conductor 24, to a conductive portion of stylus 10.

A suitable filter 26 will be positioned within basin 12 and an electrolyte 28 will be pumped from basin 12 through filter 26 by means of a pump 30. The electrolyte will be recirculated to basin 16 via stylus 10. Because of the low electrolyte flow rate required in the practice of the invention, the pump 30 and basin 12 will be of comparative small size and the apparatus will thus be portable.

In the manner known in the art, when power supply 20 is in the energized state and the pump 30 is also energized, the electrolyte discharged from the tip of stylus 10 will flow over a portion of the work piece 14 which is to have material removed therefrom and current will flow between the conductive portions of the stylus and the work piece. The work piece will thus be electrochemically machined in the area exposed to the wash of electrolyte. The amount and pattern of current flow, and thus the rate and pattern of removal of material from the work piece, will be a function of the configuration of the conductive portions of stylus 10. That is, the current density, which is one of the principal factors in determining the rate at which metal is removed from the work piece, depends to a large extent upon the shape of the conductive portions of the stylus. In accordance with the present invention, the stylus is designed so as to maximize the conductive area which is to be juxtapositioned to the work piece while simultaneously establishing an adequate, but not excessive, electrolyte flow rate between the stylus and work piece.

The particular stylus tip configuration shown in FIG. 1 will be described in further detail below. It should, for the present, be sufficient to note that in the stylus of FIG. 1 the electrolyte is discharged from an annular passage as indicated by arrows and the members which define both the inner and outer diameter of this annular electrolyte flow passage at the discharge end of the stylus are comprised of conductive material and thus function as an electrode of the electrochemical machining apparatus.

Figure 2:
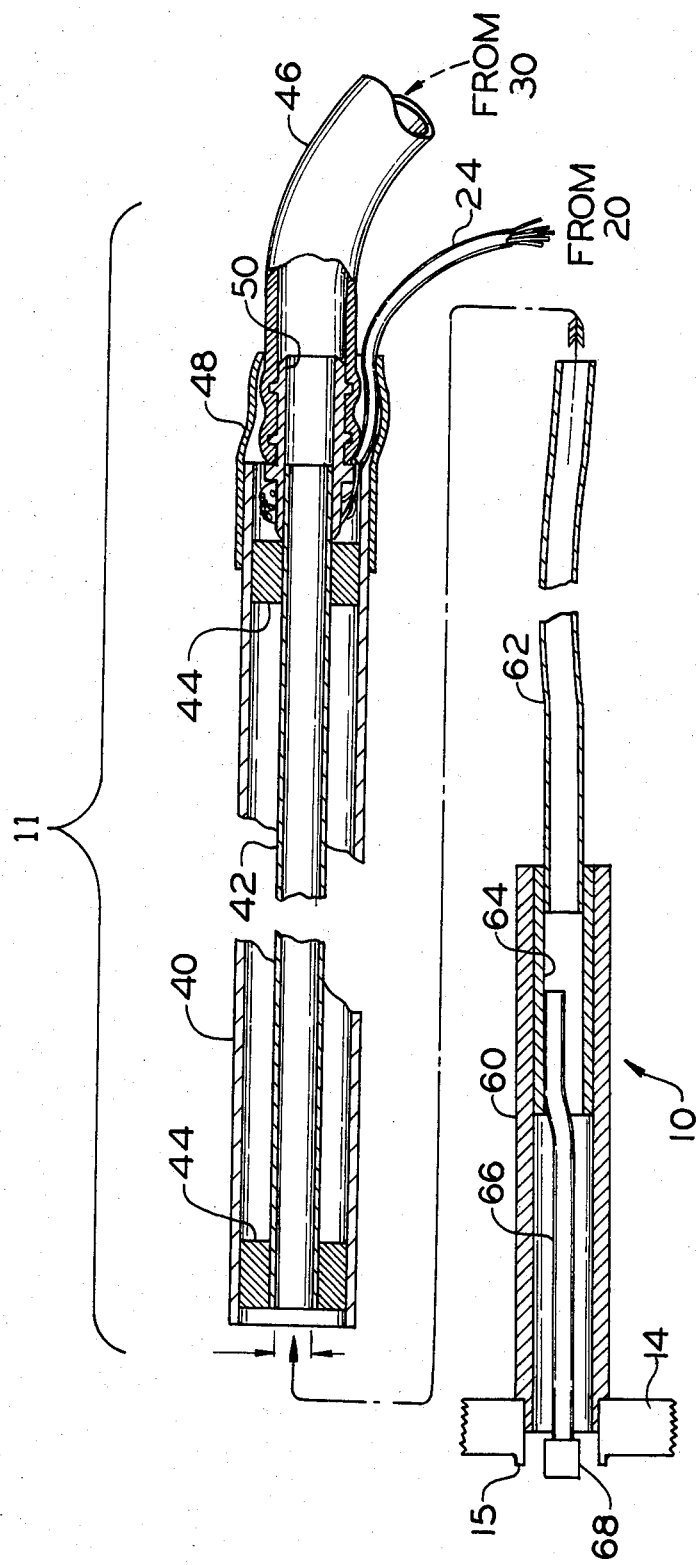
FIG. 2 is an exploded, cross-sectional side elevation view of the handle of the apparatus of FIG. 1, FIG. 2 also depicting an alternative stylus for use with the apparatus of FIG. 1.

Referring now to FIG. 2, a handle and stylus assembly in accordance with the present invention is shown in cross-section. The handle 11 comprises a tubular outer grip member 40 which is formed of a non-conductive material. A conductive tube 42 is supported within grip member 40 by means of a pair of non-conductive annular shaped spacers 44. The exterior of grip member 40 is mechanically coupled to the exterior of a flexible hose 46, which is in turn coupled to the discharge port of pump 30, via a clamp sleeve 48 which is also preferably comprised of a non-conductive material. A hose coupling 50, which in the disclosed embodiment is comprised of an electrically conductive material, defines a fluid-tight connection between the interior of hose 46 and the exterior of conductive tube 42. The conductor 24, which in FIG. 2 is depicted as comprising a multistrand insulated electrical cable, is affixed to the coupling member 50 in any suitable manner, by soldering for example, so as to establish an electrical connection between coupling member 50 and power supply 20 whereby the tube 42 is electrically connected to a first polarity terminal of the power supply.

In accordance with the present invention the stylus 10 is designed to be easily installed in handle 11 whereby stylus replacement may be readily effected. Also in accordance with the present invention, the simple insertion of the stylus into the handle will establish the electrical connection between the stylus and the tubular conductor 42 of the handle and will simultaneously establish a flow path for the electrolyte from hose 46 to the stylus tip.

Figure 4:
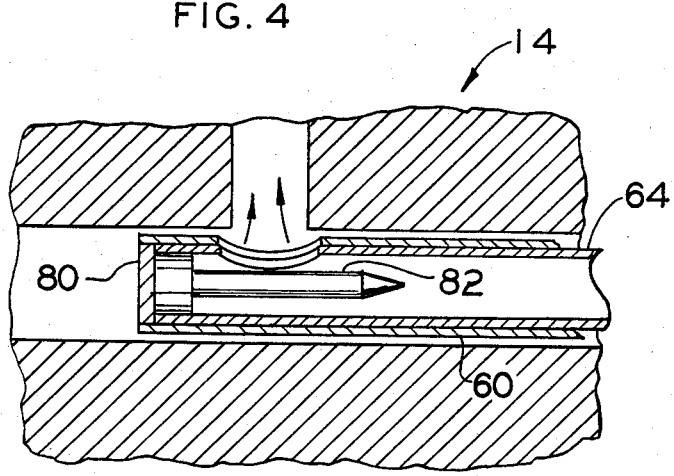
FIG. 4 is a cross-sectional view of the tip portion of yet another stylus for use with the present invention.

Further in accordance with the invention, the stylus may be rotated about the axis of the handle, as defined by co-axial members 40 and 42, so that the stylus may be "aimed" in a direction which is best suited for the particular machining operation to be performed. This aiming is particularly important for a stylus having a curved tip portion, as shown in FIG. 1, or a stylus having an electrolyte discharge port in the side thereof as shown in FIG. 4.

Continuing to refer to FIG. 2, the stylus 10 is comprised of a non-conductive outer sleeve 60. Sleeve 60 preferably has an outer diameter which is commensurate with the inner diameter of grip member 40. A conductive metal tube 62 extends rearwardly with respect to sleeve 60. Conductive tube 62 is, in the FIG. 2 embodiment, supported by a conductive sleeve 64 at the end thereof which is within sleeve 60. Sleeve 64 has an outer diameter commensurate with the inner diameter of sleeve 60 while tube 62 has an outer diameter commensurate with the inner diameter of sleeve 64. Conductive tube 62, at the end received within sleeve 64, is co-axial with sleeves 60 and 64. Tube 62 has an outer diameter which is slightly less than the inner diameter of conductive tube 42 of handle 11. Conductive tube 62 is deformed about its axis as shown and, because of the material from which it is fabricated and its length, tube 62 will possess a certain degree of resiliency.

To assemble the handle and stylus, the end of conductive tube 62 is inserted in the end of conductive tube 42 and the handle and stylus are then pushed together. Tube 62 will flex as the parts are pushed together thus permitting full insertion into tube 42, i.e., insertion to the point of abutting contact being established between sleeve 60 and the leading spacer 44. When the stylus is installed tube 62 will be resiliently captured in tube 42 but will also be rotatable with respect thereto. Because of the relatively large surface areas where there will be physical contact between tubes 42 and 62, the tube 62, and thus also sleeve 64, will be electrically connected and thus effectively form an extension of conductor 24. The abutting contact between sleeve 60 and spacer 44 and the over-lapping of a portion of sleeve 60 by the end portion of grip member 40 will insure that there will be no electrolyte leakage between handle 11 and stylus 10.

The stylus 10 of the FIG. 2 embodiment is completed by an electrode 66 which is affixed to conductive sleeve 64 in any suitable manner, welding or soldering for example. In the FIG. 2 embodiment the electrode 66 extends from sleeve 64 past the forward end of sleeve 60 and, other than in the immediate vicinity of the region where electrode 66 is affixed to sleeve 64, the electrode is substantially co-axial with sleeve 60. Electrode 66 thus cooperates with sleeve 60 to define an annular passage through which the electrolyte will flow and be discharged onto the work piece 14, the electrolyte flowing through hose 46, connector 50, tubes 42 and 62, sleeve 64 and sleeve 60. Electrode 66 may be solid or hollow as required.

The apparatus of FIG. 2 is designed for removing burrs 15 which have been formed on the back side of a metal plate during the process of drilling holes. To expedite the removal of such burrs, the end of sleeve 60 is provided with a leading end portion of reduced outer diameter, this portion defining an annular positioning shoulder and having an outer diameter which is commensurate with the diameter of the holes in the work piece 14. Accordingly, the sleeve 60 may be positioned on the work piece as shown and the portion thereof of reduced outer diameter will insure the positioning of the electrode 66 coaxially with the drilled holes. This positioning, in turn, will insure that the burrs 15 will be removed before any significant amount of material is removed from the edges of the drilled hole where there are no burrs. The electrode 66 is provided with an enlarged tip portion 68 which, in the example being described, is of cylindrical shape. The enlarged portion 68 will result in maximum current density in the region of the burrs and an increased rate of material removal. The highest current density will, of course, be at irregular projections on the work piece, such as the burrs 15, and thus the burrs will be removed first followed, if desired, by radiusing of the edge of the drilled hole at the inside of the work piece. The centering of the electrode in the hole will, if the edge is to be radiused, insure even machining about the circumference of the hole.

Referring again to FIG. 1, the stylus 10 shown therein also includes the resilient mechanical connection to the handle as defined by tubular conductor 62. In the FIG. 1 embodiment, however, the conductive sleeve 64 extends within sleeve 60 to a point which is set back slightly from the end of sleeve 60, both of sleeves 60 and 64 being curved as shown. The embodiment depicted in FIG. 1 also includes a conductive member 70 which may be either of tubular or solid construction. Conductive member 70 is mechanically and electrically connected to sleeve 64 and is shaped so that, at the end of sleeve 64, the member 70 will be co-axial therewith as shown. Accordingly, the conductive sleeve 64 and member 70 cooperate to define an annular discharge port for the electrolyte. Since both annulus defining members are comprised of conductive material and are connected to the current source 20, the current density in the vicinity of the end of stylus 10 will be high. It will be understood that the sleeve 64 of the embodiment of FIG. 2 could, if necessary to achieve the requisite current density pattern, be extended to the vicinity of the end of sleeve 60.

Figure 3:
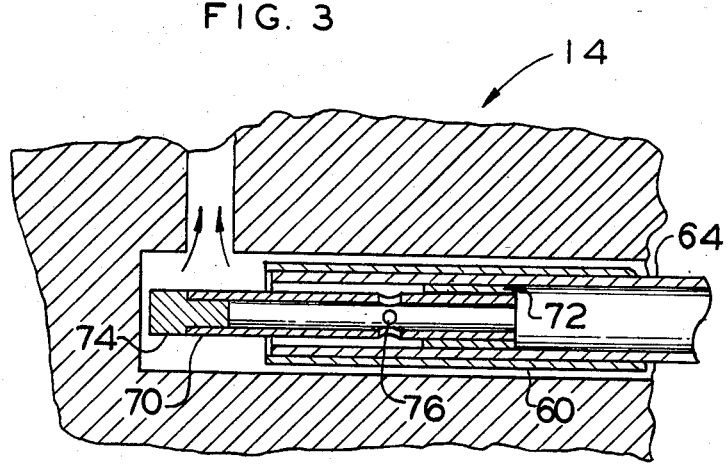
FIG. 3 is a cross-sectional view of the tip portion of another alternative stylus for use with the present invention.

Referring now to FIG. 3, a further embodiment of a stylus in accordance with the present invention is depicted. The stylus of FIG. 3 is intended for use in the deburring of the edge of a bore which intersects a blind hole adjacent the base thereof. In FIG. 3 the conductive tube 62 is not shown and the conductive sleeve 64 extends to a point adjacent the end of the non-conductive outer sleeve 60. A further short conductive tube 70 is supported within, and coaxially with, sleeves 60 and 64 by means of an annular conductive spacer 72. Tube 70 will, via spacers 72, be electrically connected to sleeve 64 and thus will be connected to power supply 20. The stylus of FIG. 3 further includes a non-conductive plug 74 which is received in the end of tubular conductor 70.

The tubular conductor 70 cooperates with the conductive sleeve 64 to define a annular electrolyte discharge port. The electrolyte is delivered to this port via a plurality of apertures 76 which are provided in conductor 70, the interior of conductor 70 being in fluid communication with the interior of sleeve 64. The plug 74 is easily removable and will be selected to have a length such that it will, when the apparatus is in use, rest on the bottom of the blind hole in the work piece and will position the tubular conductor 70 such that it spans an extension of the side bore which has the burrs to be removed at the end thereof. Alternatively, the subassembly of the tubular electrode 70 and plug 74 may be replaced as a unit.

In the FIG. 4 embodiment, which is also intended for the use of the removal of burrs or the radiusing of the corners of a side bore which intersects a main bore, the conductive sleeve 64 extends almost to the end of nonconductive sleeve 60. Sleeves 60 and 64 are provided with aligned apertures therein which cooperate to define an electrolyte discharge port in the side of the stylus. The end of sleeve 60 is capped, by a non-conductive plug 80 as shown, thus forcing the electrolyte, which is supplied via sleeve 64, to exit the side port. A generally nail-shaped conductive probe 82 is positioned within conductive sleeve 64 and is in electrical contact therewith. Probe 82 has a portion which extends coaxially with sleeves 60 and 64 and transverse to the axis of the electrolyte discharge port. Probe 82 thus effectively spans the electrolyte discharge port and increases the electrode area in the immediate vicinity of the region of the work piece to be machined. This increased electrode area, in turn, increases the current density and thus expedites the machining operation.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In an electrochemical machining apparatus, the apparatus including a source of electrolyte under pressure and a source of electrical current having a pair of terminals to which opposite polarity voltages are applied, the apparatus also including a container in which an electrically conductive workpiece to be machined is supported, the workpiece being electrically connected to a first terminal of the current source, an improved stylus comprising:

tubular handle means, said handle means having an outer member comprised of non-conductive material, said handle means further having a first tubular conductor supported within and coaxial with said outer member;

means establishing a fluid tight connection between the source of electrolyte and the interior of said handle means first tubular conductor whereby electrolyte will flow through said first tubular conductor;

means establishing an electrical connection between said handle means first tubular conductor and the second terminal of the current source; and tip means, said tip means having first and second ends and defining an electrolyte discharge port adjacent the first end thereof, said tip means including an elongated second tubular conductor having oppositely disposed first and second ends, said second tubular conductor having an axis and an outer diameter which is substantially equal to the inner diameter of said first tubular conductor, said second tubular conductor being provided intermediate said first and second ends thereof with a region wherein at least a portion of the wall surface which defines said outer diameter is displaced from said axis by a greater distance than the said wall surface of said second tubular conductor to either side of said region, said second conductor having a preselected resiliency in a direction transverse to its axis, said tip means further including an electrode defining member located in the vicinity of said discharge port, said electrode defining member being electrically connected to said second tubular conductor, an electrolyte flow path between the soruce of electrolyte and said electrolyte discharge port being defined by said first and second tubular conductors, the second terminal of the current source being electrically connected to said electrode defining member by said first and second tubular conductors whereby current may flow through the electrolyte between the workpiece and said electrode defining member.

2. The apparatus of claim 1 wherein said electrode defining member is suppoted within said second tubular conductor so as to be coaxial therewith at least in the vicinity of said electrolyte discharge port.

3. The apparatus of claim 2 wherein said electrode defining member and the second end of said second tubular conductor cooperate to define a generally annular shaped electrolyte discharge port.

4. The apparatus of claim 2 wherein said electrode defining member extends from the second end of said second tubular conductor and wherein said tip means further comprises a non-conductive outer sleeve, said sleeve being coaxial with said second tubular conductor in the region of the second end thereof.

5. The apparatus of claim 4 wherein said sleeve extends from the second end of said second tubular conductor and defines an extension of the flow path for the electrolyte, an end of said sleeve cooperating with said electrode defining member to form a generally annular shaped electrolyte discharge port.

6. The apparatus of claim 5 wherein said end of said sleeve defines a positioning stop for supporting said tip means on a workpiece.

7. The apparatus of claim 4 wherein said tip means further comprises:
a non-conductive stop member mounted on said electrode defining member at the end thereof which extends from said second tubular conductor, said stop member being adapted to contact the workpiece and define the spacing between an exposed portion of said electrode defining member and a region of the workpiece to be machined.

8. The apparatus of claim 2 wherein said tip means further comprises:
a non-conductive outer sleeve, said sleeve being mounted on the exterior of said second tubular conductor and extending along a portion the length thereof, which is displaced from said first end of said second tubular conductor.

9. The apparatus of claim 8 wherein said electrolyte discharge port is defined by aligned apertures in said second tubular conductor and sleeve and wherein said electrode defining member extends from the second end of said second tubular conductor toward the first end thereof to a point which is upstream from said discharge port.

10. The apparatus of claim 8 wherein said sleeve extends beyond the second end of said second tubular conductor.

11. The apparatus of claim 10 wherein said sleeve and said electrode defining member cooperate to form a generally annular shaped electrolyte discharge port.

12. The apparatus of claim 11 wherein said electrode defining member projects beyond the end of said sleeve and is provided with a portion of enlarged surface area in the projecting portion thereof, the end of said sleeve being adapted to function as a workpiece contacting positioning stop.

* * * * *